United States Patent
Luber et al.

(10) Patent No.: US 8,791,995 B2
(45) Date of Patent: Jul. 29, 2014

(54) STEREO VIDEO MICROSCOPE SYSTEM

(75) Inventors: Joachim Luber, St. Margrethen (CH); Steffen-Volker Janik, Au (CH)

(73) Assignee: Swiss Medical Technology GmBH, Widnau (CH)

( * ) Notice: Subject to any disclaimer, the term of this patent is extended or adjusted under 35 U.S.C. 154(b) by 915 days.

(21) Appl. No.: 12/515,943

(22) PCT Filed: Nov. 21, 2007

(86) PCT No.: PCT/EP2007/010095
§ 371 (c)(1),
(2), (4) Date: Jan. 28, 2010

(87) PCT Pub. No.: WO2008/061738
PCT Pub. Date: May 29, 2008

(65) Prior Publication Data
US 2010/0141739 A1    Jun. 10, 2010

Related U.S. Application Data

(60) Provisional application No. 60/860,398, filed on Nov. 21, 2006.

(30) Foreign Application Priority Data

Nov. 21, 2006    (EP) .................................... 06024158

(51) Int. Cl.
*H04N 7/18* (2006.01)
*G02B 21/00* (2006.01)

(52) U.S. Cl.
USPC ............................................. 348/79; 359/384

(58) Field of Classification Search
USPC .......................................................... 348/79
See application file for complete search history.

(56) References Cited

U.S. PATENT DOCUMENTS

| | | | |
|---|---|---|---|
| 5,690,417 A | 11/1997 | Polidor et al. | |
| 5,867,210 A | 2/1999 | Rod | |

(Continued)

FOREIGN PATENT DOCUMENTS

| | | |
|---|---|---|
| EP | 1293816 | 3/2003 |
| JP | 2000-089123 | 3/2000 |
| JP | 2001-145640 | 5/2001 |

OTHER PUBLICATIONS

XP008087843—Müntener "Surgical operating microscopes, series M 600 from WILD Heerbrugg Ltd." Neurosurgical Review, vol. 7, pp. 103-107, Jun. 1984.

(Continued)

*Primary Examiner* — Hamza Algibhah
*Assistant Examiner* — James Edwards
(74) *Attorney, Agent, or Firm* — Pillsbury Winthrop Shaw Pittman LLP

(57) ABSTRACT

A stereo video microscope system (10), comprising: a stereo video microscope (11) having two output channels for providing stereo image data and including an internal lighting; a display unit (14) having two input channels for receiving and displaying stereo image data; and a control unit operably connected to the stereo video microscope (11) and the display unit (14) such that the control unit can control the operation of the stereo video microscope (11) and the display unit (14) and the flow of stereo image data between the two output channels of the stereo video microscope (11) and the two input channels of the display unit (14). In one embodiment the control unit is configured for performing an image rotation and/or exchanging the output channels such that the stereo image is always upright.

25 Claims, 1 Drawing Sheet

(56) References Cited

U.S. PATENT DOCUMENTS

| | | | |
|---|---|---|---|
| 6,046,844 A | 4/2000 | Duis | |
| 6,204,963 B1* | 3/2001 | Grafenhain et al. | 359/384 |
| 6,483,948 B1* | 11/2002 | Spink et al. | 382/255 |
| 2001/0055062 A1* | 12/2001 | Shioda et al. | 348/79 |
| 2002/0015224 A1 | 2/2002 | Ganser | |
| 2002/0135678 A1* | 9/2002 | Bacus et al. | 348/143 |
| 2003/0112509 A1 | 6/2003 | Takahashi | |
| 2004/0036962 A1 | 2/2004 | Brunner et al. | |
| 2005/0046933 A1 | 3/2005 | Luecke et al. | |
| 2005/0111090 A1 | 5/2005 | Kleinteich et al. | |
| 2005/0203367 A1* | 9/2005 | Ahmed et al. | 600/407 |
| 2006/0029376 A1* | 2/2006 | Yamada et al. | 396/20 |
| 2006/0164722 A1* | 7/2006 | Kawanabe | 359/383 |
| 2009/0196591 A1* | 8/2009 | Nurishi | 396/82 |
| 2010/0208054 A1* | 8/2010 | Farr | 348/80 |
| 2011/0175991 A1* | 7/2011 | Hoeg et al. | 348/65 |

OTHER PUBLICATIONS

XP002473073—D.F. Vasconcellos S/A "MC-M902MF Instructions"; Aug. 2001; http://www.endoscopia.com.mx/index.php?option=com_docman&task=doc_download&gid=104>.

XP002473112—Carl Zeiss Surgical "OPMI Vario/S 88 System, Expand Your Vision"; 2002; http://www.zeiss.com/C1256E3C00542C9B/0/D88EE6743A3F9227C1256E66002C3685/$file/30_324_ii_e.pdf.

* cited by examiner

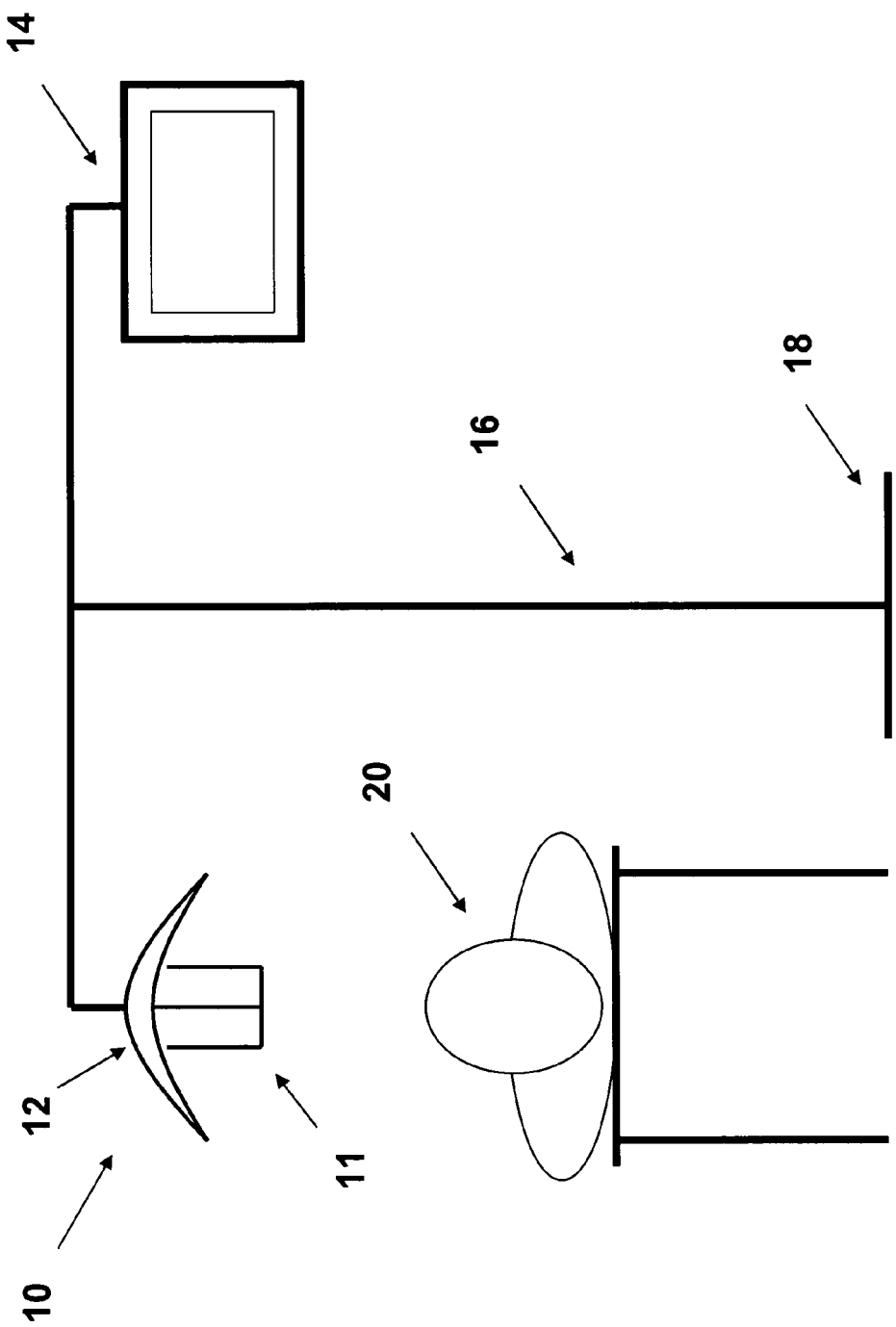

STEREO VIDEO MICROSCOPE SYSTEM

This application claims priority under 35 U.S.C. §119 of EP 06024158.5, filed Nov. 21, 2006, and is the United States national phase of PCT/EP2007/010095, filed Nov. 21, 2007 (published in the English language on May 29, 2008, as WO 2008/061738 A1; the title and abstract were also published in English), and claims benefit of U.S. Provisional Application No. 60/860,398, filed Nov. 21, 2006, each hereby expressly incorporated by reference in its entirety and each assigned to the assignee hereof.

TECHNICAL FIELD OF THE INVENTION

The invention relates to a stereo video microscope system and in particular to a stereo video microscope system to be employed by medical professionals and especially dentists and surgeons.

BACKGROUND OF THE INVENTION

In the medical field it is becoming more and more common practice to use stereo microscopes for assisting medical professionals in performing such tasks as medical surgeries, examinations, treatments and the like. The medical professional using a conventional stereo microscope has to look through the eye-pieces thereof in order to study a region of interest. This, however, is often very inconvenient, because of the awkward positions the medical professional has to place himself in, in order to be able to look through the eye-pieces of the stereo microscope and to work with his hands within the region of interest. Obviously, such a situation is rather dissatisfying for the medical professional or the patient being examined and/or treated.

The position of the stereo basis of a stereo microscope is of major importance for displaying the stereo image on a display unit as well for actions of the medical professional which are triggered by what the medical professional perceives on the display unit. However, conventional stereo microscopes with a fixed stereo base have the problem that a change of the position of the microscope can lead to a rotation of the image and even to the image being displayed upside down. Obviously, this leads to an exchange of the two stereo channels on the display unit. The medical professional, i.e. the viewer, will perceive such rotations and/or exchanges in that an actual heightening is displayed as a depression and vice versa. Again, such a situation is rather confusing and, consequently, dissatisfying for the medical professional using a conventional stereo microscope.

Dentists often have to examine remote parts of the dental region of a patient which sometimes can be visually accessed only by means of a hand mirror. Consequently, such mirrors are still important even in case a stereo microscope is employed. However, using a mirror in combination with a stereo microscope involves additional challenges in that any light coming from the parts of the dental region of a patient being examined with a mirror will experience one additional interaction with the mirror (i.e. a reflection) before entering the stereo microscope. Conventional stereo microscopes do not have any means for compensating for such an effect.

The size of the field of view of a stereo microscope depends among other factors on the chosen magnification. For instance, in a zoom system with a ratio of 4:1 the diameter of the field of view would change e.g. from 100 mm to 25 mm. In conventional stereo microscopes the region illuminated by the internal lighting of the stereo microscope is fixed. This has the consequence that in conventional stereo microscopes only for a special setting the actual field of view coincides with the area illuminated by the internal lighting of the microscope. For any other setting the field of view and the area illuminated by the internal lighting of the microscope do not match such that either only a part of the actual field of view gets illuminated or that the area illuminated by the internal lighting of the microscope is larger than the actual field of view. In the latter case only a small part of the light emitted by the internal lighting of the microscope is actually "used", whereas the bulk thereof is being wasted.

In conventional stereo microscopes the focus distance is changed at a constant rate. This has the consequence that at low magnifications the change of the focus is perceived to be rather slow, whereas at high magnifications the change of the focus is perceived to be rather fast. This, in turn, leads to a difficult, if not impossible fine adjustment of the focus distance at high magnifications in conventional stereo microscopes.

The internal lighting of a conventional stereo microscope generally illuminates the field of view thereof in a fixed angular relationship with respect to the optical axis of the stereo microscope. However, as already outlined further above, a medical professional and especially a dentist often will need to examine regions which are difficult to illuminate and, thus, to image by conventional stereo microscopes having a fixed internal lighting. Obviously, this situation is dissatisfying for the medical professional.

Microscopes employed in the medical field are often used together with an external light source each being mounted to a separate support system. The separate support systems of the microscope and the external light source are prone to colliding and interfering with each other and, consequently, it is often very difficult to manipulate and adjust these separate elements for providing an optimal internal and external illumination. Again, such a situation is rather dissatisfying for the medical professional using a conventional microscope together with an external light source.

The object of the present invention is to provide a stereo video microscope system overcoming or at least mitigating the problems associated with conventional systems as outlined above.

SUMMARY OF THE INVENTION

The above object is achieved by a stereo video microscope system according to claim 1. The stereo video microscope system according to the present invention comprises a stereo video microscope having two output channels for providing stereo image data and including an internal lighting, a display unit having two input channels for receiving and displaying stereo image data and a control unit. The control unit is operably connected to the stereo video microscope and the display unit such that the control unit can control the operation of the stereo video microscope and the display unit and the flow of stereo image data between the two output channels of the stereo video microscope and the two input channels of the display unit.

Further preferred beneficial embodiments are defined in the sub-claims.

BRIEF DESCRIPTION OF THE DRAWINGS

FIG. 1 shows schematically a preferred embodiment of the stereo video microscope system according to the present invention.

DETAILED DESCRIPTION OF PREFERRED EMBODIMENTS

A preferred embodiment of the stereo video microscope system 10 according to the present invention is shown in FIG. 1. The stereo video microscope system 10 comprises a stereo video microscope 11 which in addition to its own internal lighting (not shown) is embedded within an external lighting unit 12. A stereo video microscope 11 which suitably can be employed in the stereo video microscope system 10 according to the present invention is described, for instance, in EP 05 026 775 (assigned to the same applicant as the present application).

The stereo video microscope 11 and the external lighting unit 12 are mounted to a common support structure 16. Although the support structure 16 is shown in FIG. 1 as fixedly mounted to a base 18 resting on the floor, the support structure 16 equally could be fixedly mounted to a wall or a ceiling. Also, the support structure 16 could be resting on a movable base 18 such that the stereo video microscope system 10 according to the present invention can be moved to any desired location. The person skilled in the art will appreciate that an appropriate support structure 16 could be made out of a variety of elements, such as support rods or telescope arms, hinged connections connecting these elements, stabilizing elements and the like. Therefore, the details of these elements will not be described in any greater detail herein.

As shown in FIG. 1, also the display unit 14 is preferably mounted to the support structure 16, e.g. to a further arm thereof. The stereo video microscope 11 and the display unit 14 should be connected e.g. to two separate arms of the support structure 16 such that these two arms can be rotated freely with respect to the support structure 16 without interfering with each other. For instance, this can be readily achieved by positioning the arm connecting the stereo video microscope 11 to the support structure 16 and the arm connecting the display unit 14 to the support structure 16 at different heights thereof.

The stereo video microscope 11 is connected to a control unit (not shown) which in turn is connected to the display unit 14. Such a control unit could be integrated into the stereo video microscope 11 or external thereto. The control unit is configured to allow for user input to control the stereo video microscope 11 and/or the display unit 14 and to manage the flow of stereo image data from the stereo video microscope 11 to the display unit 14. Thus, the stereo image data acquired by the two channels of the stereo video microscope 11 is transferred via the control unit to the display unit 14 and displayed in an appropriate form on a screen thereof. As the person skilled in the art will appreciate an auto-stereoscopic or a stereoscopic monitor represent viable embodiments of the display unit 14 capable of displaying the stereo image data provided by the two channels of the stereo video microscope 11 in an appropriate manner.

Auto-stereoscopic and stereoscopic monitors display a left eye image and a right eye image, which are transmitted to the brain of the viewer for processing. In order to perceive a stereoscopic effect several techniques have been developed to ensure that each eye sees the image it is supposed to see, i.e. the left eye of the viewer sees the left eye image and the right eye sees the right eye image. When, for instance, a viewer is looking through synchronized shutter glasses at a stereoscopic monitor, the glasses "shutter" on and off, alternatively showing the left eye only the left eye image and the right eye only the right eye image. The shutter switches on and off so quickly that the viewer's brain "fuses" the two images into a single stereoscopic image such that a three-dimensional stereo image is perceived. As known to the person skilled in the art a similar effect can be provided in the case of auto-stereoscopic monitors by techniques known, for instance, as parallax barrier or lenticular plate.

Preferably, also the external lighting unit 12 is connected to and controllable by the control unit. The external lighting unit 12, preferably, includes a plurality of light emitting diodes LEDs) which e.g. could be arranged as a ring of LEDs centered around the stereo video microscope 11 and a reflector for illuminating the field of view of the stereo video microscope 11 in the direction of the patient 20. According to the present invention the LEDs of the external lighting unit 12 can be driven and controlled by the control unit. To this end, an appropriate interface between the external lighting unit 12 and the control unit can be provided. The control unit should allow for modes of operation providing only light from the external lighting unit 12, only light from the internal lighting of the stereo video microscope 11 as well as a combination of light from the external lighting unit 12 and the internal lighting of the stereo video microscope 11. These operation modes can be selected by means of the control unit connected to the stereo video microscope 11 and the external lighting unit 12.

According to a further aspect of the invention the control unit of the stereo video microscope system 10 comprises means or is configured for performing an image rotation and/or exchanging the two output channels provided by the stereo video microscope 11 for certain positions of the stereo video microscope 11 such that it is assured that the stereo image displayed on the display unit 14 is always upright and not laterally reversed (i.e. "left is left and right is right"). The image rotation can e.g. be provided by an appropriately configured software algorithm implemented within the control unit which processes the stereo image data provided by the two channels of the stereo video microscope 11. Alternatively, the image rotation can be achieved by means of a mechanical rotation of the stereo video microscope 11 itself about its optical axis under control of the control unit. Preferably, the control unit is further configured to perform an image rotation and/or an exchange of the two stereo channels upon corresponding instructions issued by a user, e.g. by means of a switch or a keypad connected to the control unit or voice commands. Alternatively, the control unit initiates an image rotation and/or an exchange of the two stereo channels automatically if a positioning sensor (not shown) indicates that the stereo video microscope 11 is located in a position relative to the object of interest, e.g. the patient 20, which necessitates such an action by the control unit in order to provide for an upright and not laterally reversed display of the stereo image data by the display unit 14.

According to a still further aspect of the invention the control unit is furthermore configured or comprises means for providing for an appropriate image rectification in case a mirror is used in combination with the stereo video microscope system 10. In order to provide for an upright and not laterally reversed image displayed by the display unit 14 the image rectification procedure preferably involves producing respective mirror images of the images provided by the two channels of the stereo video microscope 11 and exchanging the two channels of the display unit 14. Again, the control unit is configured to perform such an image rectification upon being provided with the information that a mirror is used, such as by corresponding instructions issued by a user, by means of a switch or a keypad connected to the control unit or voice commands. Alternatively, the control unit is configured to automatically establish that a mirror is used. This can be accomplished e.g. by an appropriately configured software algorithm implemented in the control unit which is able to establish the presence of a mirror in the stereo image data provided by the stereo video microscope 11. The person skilled in the art will, however, appreciate that several other means exist allowing for an automatic determination that a mirror is being used, such as magnetic field sensors detecting the presence of the ferrous mirror within the region of interest, a contact sensor in the mirror holder and the like.

According to a yet still further aspect of the present invention the control unit is configured to adjust the size of the area illuminated by the internal lighting of the stereo video microscope 11 and/or the external lighting unit 12 to the size of the actual field of view of the stereo video microscope 11. Such an adjustment of the size of the illuminated area by means of the control unit provides for a better efficiency in case the lighting power of the internal lighting of the stereo video microscope 11 and/or the external lighting unit 12 are kept constant. Alternatively, it becomes possible to reduce the intensity of the light emitted by the internal lighting of the stereo video microscope 11 and/or the external lighting unit 12 without degrading the illumination, by keeping the ratio of emitted light to illuminated area substantially constant. Obviously, the latter case is beneficial and preferred due to the reduced energy consumption and, thus, a prolonged lifetime of the internal lighting of the stereo video microscope 11 and/or the external lighting unit 12. In any event, due to the adjustment of the area illuminated by the internal lighting of the stereo video microscope 11 and/or the external lighting unit 12 to the actual field of view of the stereo video microscope 11 no light energy is being lost or wasted.

According to a further aspect of the present invention the control unit is configured to continuously adjust the rate of changing the focus distance, i.e. the focus speed, depending on the chosen magnification of the stereo video microscope 11. Preferably, the control unit is configured to automatically select a higher focus speed for lower magnifications than for higher magnifications of the stereo video microscope 11. For instance, for a magnification of 10× the focus speed could be twice as large as for a magnification of 20×. This could be achieved e.g. by continuously adjusting the focus speed (FS) to the chosen magnification (MG) according to the following equation:

$$FS(MG) = FS_{MAX} - \frac{FS_{MAX} - FS_{MIN}}{MG_{MAX} - MG_{MIN}} * (MG - MG_{MIN}),$$

wherein $FS_{MAX}$, $FS_{MIN}$, $MG_{MAX}$ and $MG_{MIN}$ are the maximal focus speed, the minimal focus speed, the maximal magnification and the minimal magnification of the stereo video microscope 11, respectively. The person skilled in the art, however, will appreciate that other specific functional relationships between the focus speed and the magnification can be chosen which fulfil the requirement that the focus speed is higher for lower magnifications than for higher magnifications of the stereo video microscope 11. The relation between the focus speed and the magnification preferably can be adjusted by the user via the control unit or the stereo video microscope 11 in order to best suit his needs.

In case a user simultaneously adjusts the rate of changing the focus distance, i.e. the focus speed, and the magnification of the stereo video microscope 11, the control unit is configured to select the optimal respective default values of these quantities. This can be achieved e.g. by an appropriately configured software algorithm implemented in the control unit or the stereo video microscope 11 determining the direction of these simultaneous changes.

According to a further aspect of the present invention the stereo video microscope 11 is provided with an optical lighting port connected to the internal lighting thereof. A small flexible optical fiber (not shown) is attached to the lighting port, such that the small flexible fiber can be grasped and guided by a user to provide light in regions which cannot be illuminated by the internal lighting of the stereo video microscope 11 and/or the external lighting unit 12 directly.

According to a further aspect of the present invention it is possible to change the angle between the optical axis of the stereo video microscope 11 and the symmetry axis of the internal lighting thereof. This can be achieved by means of an internal mirror system being user-adjustable with respect to the angle and the position of the mirror. Alternatively, the external lighting unit 12 could be configured to be positionable or adjustable with respect to the stereo video microscope 11 in such a way, that a user could easily change the angle and the position of the light beam illuminating the field of view of the stereo video microscope.

The present invention as described in detail above is not limited to the particular devices, uses and methodology described as these may vary. It is also to be understood that the terminology used herein is for the purpose of describing particular embodiments only, and is not intended to limit the scope of the present invention which will be limited only by the appended claims. Unless defined otherwise, all technical and scientific terms used herein have the same meanings as commonly understood by one of ordinary skill in the art.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

Several documents are cited throughout the text of this specification. Each of the documents cited herein (including all patents, patent applications, scientific publications, manufacturer's specifications, instructions, etc.), whether supra or infra, are hereby incorporated by reference in their entirety. Nothing herein is to be construed as an admission that the invention is not entitled to antedate such disclosure by virtue of prior invention.

The invention claimed is:

1. A stereo video microscope system, comprising:
    a stereo video microscope having two output channels for providing stereo image data and including an internal lighting;
    a display unit having two input channels for receiving and displaying stereo image data; and
    a control unit operably connected to the stereo video microscope and the display unit such that the control unit can control the operation of the stereo video microscope and the display unit and the flow of stereo image data between the two output channels of the stereo video microscope and the two input channels of the display unit, wherein the control unit comprises means for performing an image rotation and means for exchanging the two output channels of the stereo video microscope for certain positions of the stereo video microscope such that the stereo image displayed by the display unit is always upright and not laterally reversed, wherein the control unit comprises means for performing an image rotation and/or means for exchanging the two output channels of the stereo video microscope for certain positions of the stereo video microscope such that the stereo image displayed by the display unit is always upright and not laterally reversed, wherein the means for performing an image rotation and the means for exchanging the two output channels of the stereo video microscope are provided by a software algorithm implemented within the control unit.

2. A system according to claim 1, further comprising an external lighting unit, wherein the stereo video microscope is embedded within the external lighting unit.

3. The system according to claim 2, wherein the external lighting unit is connected to and controllable by the control unit.

4. The system according to claim 3, wherein the external lighting unit includes a plurality of light emitting diodes and a reflector for illuminating the field of view of the stereo video microscope.

5. The system according to any one of the preceding claims, wherein the control unit is configured to adjust the size of the area illuminated by the internal lighting of the stereo video microscope and/or the external lighting unit to the size of the actual field of view of the stereo video microscope.

6. The system according to claim 5, wherein the control unit reduces the intensity of the light emitted by the internal lighting of the stereo video microscope and/or the external lighting unit if the size of the area illuminated thereby decreases and vice versa.

7. The system according to claim 1, further comprising a support structure, wherein the stereo video microscope and/or the external lighting unit are mounted to the support structure.

8. The system according to claim 7, wherein the display unit is mounted to the support structure.

9. The system according to claim 1, wherein the control unit is integrated in the stereo video microscope.

10. The system according to claim 1, wherein the display unit is an auto-stereoscopic, a stereoscopic monitor or a stereoscopic viewing device.

11. The system according to claim 1, wherein the means for performing an image rotation can control a mechanical rotation of the stereo video microscope about its optical axis.

12. The system according to claim 1, wherein the means for performing an image rotation and/or the means for exchanging the two output channels of the stereo video microscope is controlled by corresponding commands issued by a user.

13. The system according to claim 1, wherein the means for performing an image rotation and/or the means for exchanging the two output channels of the stereo video microscope is automatically triggered to perform an image rotation and/or to exchange the two output channels of the stereo video microscope if a positioning sensor indicates that the stereo video microscope is located in a position which necessitates such an action.

14. The system according to claim 1, wherein the control unit comprises means for performing an image rectification in case a mirror is used in combination with the stereo video microscope system.

15. The system according to claim 14, wherein the means for performing an image rectification are configured to produce respective mirror images of the images provided by the two channels of the stereo video microscope and to exchange the two channels of the display unit.

16. The system according to claim 14, wherein the means for performing an image rectification are controlled by corresponding commands issued by a user.

17. The system according to claim 14, wherein means for performing an image rectification are automatically triggered by the control unit to perform an image rectification in the event that the usage of a mirror is established.

18. The system according to claim 17, wherein the control unit comprises means for establishing the presence of a mirror in the stereo image data provided by the stereo video microscope.

19. The system according to claim 17, further comprising at least one magnetic field sensor and/or at least one contact sensor for establishing the usage of a mirror.

20. The system according to claim 1, wherein the control unit is configured to adjust the rate of changing the focus distance depending on the chosen magnification of the stereo video microscope.

21. The system according to claim 20, wherein the control unit is configured to automatically select a higher rate of changing the focus distance for lower magnifications than for higher magnifications of the stereo video microscope.

22. The system according to claim 1, further comprising a flexible optical fiber attached to a lighting port of the stereo video microscope.

23. A stereo video microscope system, comprising:
a stereo video microscope having two output channels for providing stereo image data and including an internal lighting;
a display unit having two input channels for receiving and displaying stereo image data; and
a control unit operably connected to the stereo video microscope and the display unit such that the control unit can control the operation of the stereo video microscope and the display unit and the flow of stereo image data between the two output channels of the stereo video microscope and the two input channels of the display unit, wherein the control unit comprises an image rotator for performing an image rotation and an output channel exchanger for exchanging the two output channels of the stereo video microscope for certain positions of the stereo video microscope such that the stereo image displayed by the display unit is always upright and not laterally reversed.

24. The system of claim 23, wherein the image rotator comprises a software algorithm implemented within the control unit.

25. The system of claim 23, wherein the output channel exchanger comprises a software algorithm implemented within the control unit.

\* \* \* \* \*